United States Patent
Ito

(10) Patent No.: US 10,088,066 B2
(45) Date of Patent: Oct. 2, 2018

(54) HYDRAULIC VALVE

(71) Applicant: NABTESCO CORPORATION, Tokyo (JP)

(72) Inventor: Koji Ito, Gifu (JP)

(73) Assignee: NABTESCO CORPORATION, Tokyo (JP)

( * ) Notice: Subject to any disclaimer, the term of this patent is extended or adjusted under 35 U.S.C. 154(b) by 0 days.

(21) Appl. No.: 14/870,836

(22) Filed: Sep. 30, 2015

(65) Prior Publication Data

US 2016/0097462 A1    Apr. 7, 2016

(30) Foreign Application Priority Data

Oct. 1, 2014  (JP) .................................. 2014-202913

(51) Int. Cl.
*F16K 17/196*    (2006.01)
*F15B 13/02*    (2006.01)

(52) U.S. Cl.
CPC .......... *F16K 17/196* (2013.01); *F15B 13/024* (2013.01); *F15B 13/027* (2013.01); *Y10T 137/7775* (2015.04); *Y10T 137/7779* (2015.04)

(58) Field of Classification Search
CPC ............. F16K 17/196; Y10T 137/7771; Y10T 137/7775; Y10T 137/7779; Y10T 137/778; F15B 13/024; F15B 13/027
USPC ........... 137/493, 493.7, 493.8, 493.9; 251/86
See application file for complete search history.

(56) References Cited

U.S. PATENT DOCUMENTS

| | | | | |
|---|---|---|---|---|
| 1,939,128 A * | 12/1933 | Meyer | ................. | F04B 53/1017 137/543.13 |
| 2,382,562 A * | 8/1945 | Harvey | ............... | A47L 15/4223 251/144 |
| 2,781,776 A * | 2/1957 | Gratzmuller | ....... | G05D 16/0658 137/505.44 |
| 3,141,474 A * | 7/1964 | Gentzel | ................. | F16K 17/082 137/469 |
| 3,145,723 A * | 8/1964 | Chorkey | ............... | F16K 17/164 137/112 |
| 3,194,261 A * | 7/1965 | Tennis | .................... | F15B 13/02 137/115.13 |
| 3,792,715 A * | 2/1974 | Parrett | .................... | F15B 11/04 137/493 |
| 4,327,767 A * | 5/1982 | Fehrenbach | ....... | G05D 16/0658 137/510 |

(Continued)

FOREIGN PATENT DOCUMENTS

WO    WO 2013/150431 A1    10/2013

OTHER PUBLICATIONS

Extended European Search Report as issued in European Patent Application No. 15187817.0, dated Mar. 2, 2016.

*Primary Examiner* — William McCalister
(74) *Attorney, Agent, or Firm* — Pillsbury Winthrop Shaw Pittman, LLP

(57) ABSTRACT

A hydraulic valve includes a biasing member for generating a biasing force to press a valve seat and a valve member. When a second hydraulic chamber has higher hydraulic pressure than a first hydraulic chamber, a hydraulic pressure difference between the first and second hydraulic chambers acts on the valve seat to separate the valve seat from the valve member against the biasing force of the biasing member so that the first hydraulic chamber and the second hydraulic chamber come into fluidal communication.

11 Claims, 8 Drawing Sheets

(56) References Cited

U.S. PATENT DOCUMENTS

| | | | |
|---|---|---|---|
| 4,433,615 A | | 2/1984 | Vick |
| 4,518,004 A | * | 5/1985 | Hsu ................. F15B 13/02 |
| | | | 137/115.18 |
| 4,543,987 A | * | 10/1985 | Ekeleme, Jr. ....... F16K 17/0413 |
| | | | 137/522 |
| 5,072,752 A | * | 12/1991 | Kolchinsky ........... F16K 31/406 |
| | | | 137/491 |
| 5,174,189 A | * | 12/1992 | Kamimura ............ F15B 20/004 |
| | | | 91/446 |
| 5,343,703 A | | 9/1994 | Kamimura |
| 5,765,590 A | * | 6/1998 | Kim ................... F15B 11/0445 |
| | | | 137/493.9 |
| 7,234,487 B2 | | 6/2007 | Jacobson et al. |
| 2001/0032675 A1 | | 10/2001 | Russell |

* cited by examiner

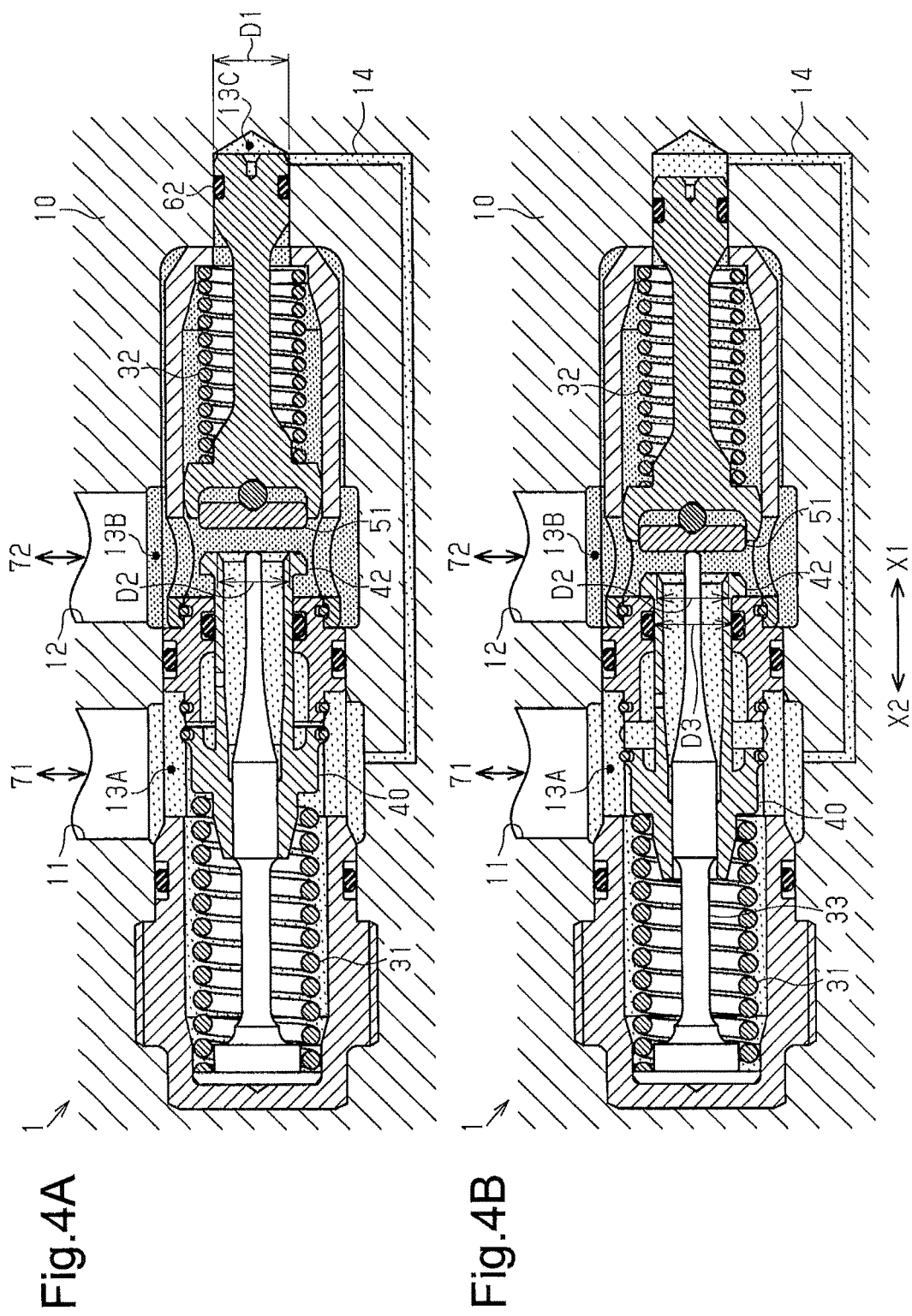

HYDRAULIC VALVE

CROSS-REFERENCE TO RELATED APPLICATIONS

This application is based upon and claims the benefit of priority from prior Japanese Patent Application No. 2014-202913, filed on Oct. 1, 2014, the entire contents of which are incorporated herein by reference.

FIELD

The present invention relates to a hydraulic valve that includes two ports complementally and alternatingly functioning as an inlet and an outlet.

BACKGROUND

U.S. Pat. No. 7,234,487 describes a hydraulic valve that is used with a hydraulic circuit, which includes a first oil channel and a second oil channel. The hydraulic valve discharges oil out of the first oil channel to the second oil channel when the hydraulic pressure of the first oil channel exceeds a predetermined value and out of the second oil channel to the first oil channel when the hydraulic pressure of the second oil channel exceeds a predetermined valve. In this manner, the hydraulic valve adjusts the hydraulic pressure of each of the first oil channel and the second oil channel to the predetermined valve or below.

As shown in FIG. 8, a conventional hydraulic valve 200 includes a housing 210 that includes a first port 211, which is connected to a first oil channel, and a second port 212, which is connected to a second oil channel. The housing 210 includes an inward projection between the first port 211 and the second port 212. The projection includes a corner portion, which defines a valve seat 213.

A poppet valve 220, which fluidically blocks the first oil channel and the second oil channel, is elastically pressed against the valve seat 213 by a compressed coil spring 230. The poppet valve 220 includes an intermediate portion the diameter of which decreases as extending away from the spring 230, defining a first taper 221, and a distal portion the diameter of which decreases toward the distal surface of the poppet valve 220, defining a second taper 222. When the second taper 222 contacts the valve seat 213, the first port 211 and the second port 212 are fluidically blocked.

When the hydraulic pressure of the first oil channel exceeds a predetermined value, the hydraulic pressure of the first port 211 presses the distal portion of the poppet valve 220. This separates the second taper 222 from the valve seat 213 against biasing force of the spring 230. Consequently, the first port 211 and the second port 212 come into fluidal communication, and oil flows from the first port 211 to the second port 212. On the other hand, when the hydraulic pressure of the second oil channel exceeds a predetermined value, the hydraulic pressure of the second port 212 presses the first taper 221 and the second taper 222 is separated from the valve seat 213 against the biasing force of the spring 230. Consequently, the second port 212 and the first port 211 come into fluidal communication, and the oil flows from the second port 212 to the first port 211.

SUMMARY

However, when the inclination of the poppet valve 220 is deviated relative to a longitudinal axis of the housing 210 or when the poppet valve 220 is displaced in a radial direction, a gap may be formed between the valve seat 213 and the second taper 222. This may cause oil leakage between the first oil channel and the second oil channel.

It is an object of the present invention to provide a hydraulic valve that limits oil leakage from a gap formed between a valve member and a valve seat when the valve member is in contact with the valve seat.

One aspect of the present invention is a hydraulic valve that includes a housing, a valve seat, a valve member, and a biasing member. The housing includes a first hydraulic chamber and a second hydraulic chamber. The valve seat has a tubular shape including a central passage and an open end and is located in the first hydraulic chamber. The open end includes a valve seat contact surface. The valve member is located in the second hydraulic chamber and includes a valve member contact surface. The biasing member generates a biasing force to press the valve seat and the valve member so that the valve member contact surface contacts the valve seat contact surface. When hydraulic pressure of the first hydraulic chamber is higher than that of the second hydraulic chamber, the hydraulic pressure of the first hydraulic chamber acts on the valve member through the central passage of the valve seat to separate the valve member from the valve seat against the biasing force of the biasing member so that the first hydraulic chamber and the second hydraulic chamber come into fluidal communication. When hydraulic pressure of the second hydraulic chamber is higher than that of the first hydraulic chamber, a hydraulic pressure difference between the first hydraulic chamber and the second hydraulic chamber acts on the valve seat to separate the valve seat from the valve member against the biasing force of the biasing member so that the first hydraulic chamber and the second hydraulic chamber come into fluidal communication.

In this structure, the contact surface of the valve seat is in planar contact with the contact surface of the valve member, the hydraulic valve is in a closed state in which the first hydraulic chamber and the second hydraulic chamber are fluidically blocked. Thus, formation of a gap between the contact surface of the valve member and the contact surface of the valve seat is limited as compared to the hydraulic valve 200 shown in FIG. 8. This limits oil leakage between the valve seat and the valve member during the closed state.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 4A is a cross-sectional view showing the hydraulic valve when the hydraulic pressure of a first hydraulic chamber is higher than that of a second hydraulic chamber, and FIG. 4B is a cross-sectional view showing the hydraulic valve when the hydraulic pressure of the second hydraulic chamber is higher than that of the first hydraulic chamber;

DESCRIPTION OF THE EMBODIMENTS

First Embodiment

Figure 1:
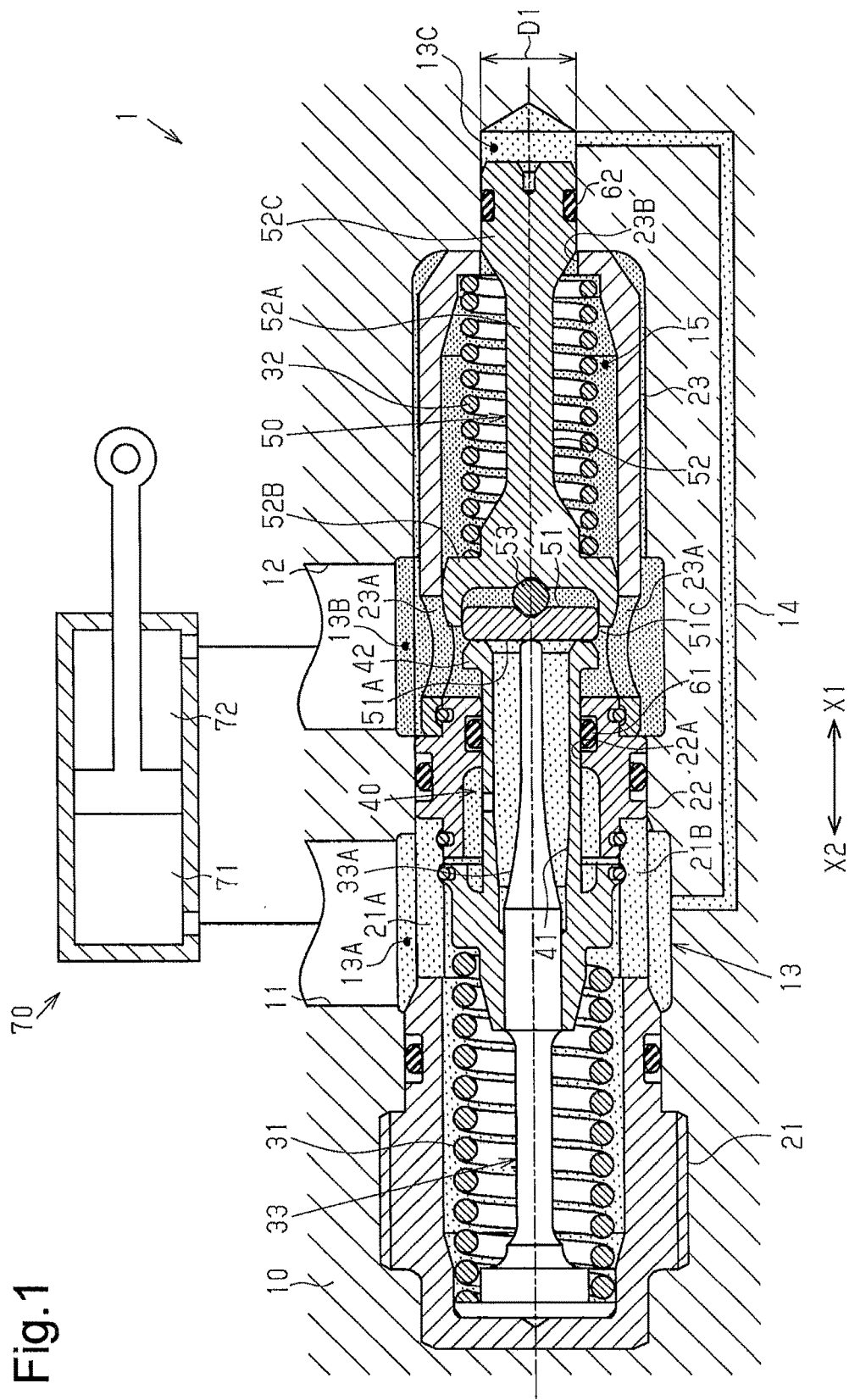
FIG. 1 is a cross-sectional view showing a first embodiment of a hydraulic valve.

The structure of a hydraulic valve 1 will now be described with reference to FIG. 1.

The hydraulic valve 1 is arranged in, for example, a spoiler drive mechanism, which uses hydraulic pressure to drive a spoiler coupled to a wing of an aircraft. The hydraulic valve 1 is connected by oil channels to a first chamber 71 and a second chamber 72 of a hydraulic cylinder 70, which drives the spoiler. The hydraulic valve 1 is a differential relief valve. When the hydraulic pressure of the first chamber 71 becomes higher than that of the second chamber 72 by at least a predetermined value, the hydraulic valve 1 discharges oil out of the first chamber 71 to the second chamber 72. When the hydraulic pressure of the second chamber 72 becomes higher than that of the first chamber 71 by at least a predetermined value, the hydraulic valve 1 discharges the oil out of the second chamber 72 to the first chamber 71.

The hydraulic valve 1 includes a housing 10 provided with an inner cavity 13, a first port 11, and a second port 12. The first port 11 and the second port 12 are communicated with the inner cavity 13. The inner cavity 13 accommodates a rod support 21, a seat support 22, and a poppet support 23, which are sequentially arranged along a central axis of the inner cavity 13 indicated by a dot-and-dash line in FIG. 1. In some embodiments, the central axis of the inner cavity 13 may be a longitudinal axis of the housing 10. The housing 10 also includes an auxiliary oil channel 14, which communicates a section of the inner cavity 13 opposed to the first port 11 with a section of the inner cavity 13 located at the side of the poppet support 23. In the description, hereafter, a direction extending from the rod support 21 toward the poppet support 23 may be referred to as the "first direction X1", and a direction extending from the poppet support 23 toward the rod support 21 may be referred to as the "second direction X2".

The rod support 21 is fixed to an end of the housing 10 in the second direction X2. The rod support 21 is cup-shaped and opens to the seat support 22. The rod support 21 includes a first cutaway portion 21A, which is opposed to the first port 11. Also, the rod support 21 includes a second cutaway portion 21B, which is opposed to the first cutaway portion 21A.

The seat support 22 is coupled to an open end of the rod support 21 and fitted in the housing 10 between the first port 11 and the second port 12. The seat support 22 is cup-shaped and opens toward the rod support 21. The seat support 22 includes an inner circumferential portion, defining a seat support hole 22A. An annular seal member 61 is attached in the seat support hole 22A. The seal member 61 is elastic and, for example, an O-ring.

The poppet support 23 is coupled to an end, in the first direction X1, of the seat support 22 and in contact with an inner surface of the housing 10 that intersects with the central axis of the inner cavity 13. The poppet support 23 is cup-shaped and opens toward the seat support 22. The poppet support 23 includes cutaway portions 23A at locations opposed to the second port 12. The poppet support 23 includes an end in the first direction X1, which is provided with a rod insertion hole 23B.

A first spring 31, a second spring 32, a pressing rod 33, a valve seat 40, and a valve unit 50 are located in a cavity surrounded by the rod support 21, the seat support 22, and the poppet support 23. The first spring 31 and the second spring 32 are each an example of a biasing member. The pressing rod 33 is an example of a restriction member. The pressing rod 33, the valve seat 40, and the valve unit 50 are each formed from metal.

The pressing rod 33 includes an end, in the second direction X2, which is in contact with an end, in the second direction X2, of the rod support 21. The pressing rod 33 includes an intermediate portion the diameter of which decreases toward a distal end of the pressing rod 33, defining a taper 33A. The outer diameter of the taper 33A may decreases in the first direction X1.

The valve seat 40 has a tubular shape including a central passage. The valve seat 40 is fitted to the pressing rod 33. More specifically, the pressing rod 33 is inserted in the central passage of the valve seat 40. The valve seat 40 is fitted in the seat support hole 22A of the seat support 22. The valve seat 40 is provided with a taper 41, the inner diameter of which increases in the first direction X1, and a plurality of communication holes (not shown), which communicate the inside of the valve seat 40 with the outside, at locations opposed to the taper 33A of the pressing rod 33. The communication holes are arranged at equal intervals in a circumferential direction of the valve seat 40. The valve seat 40 includes an open end portion 42 in which the central passage opens. The open end portion 42 extends in a direction orthogonal to the central axis of the inner cavity 13 (hereafter, referred to as the direction orthogonal to the housing 10).

Figure 2:
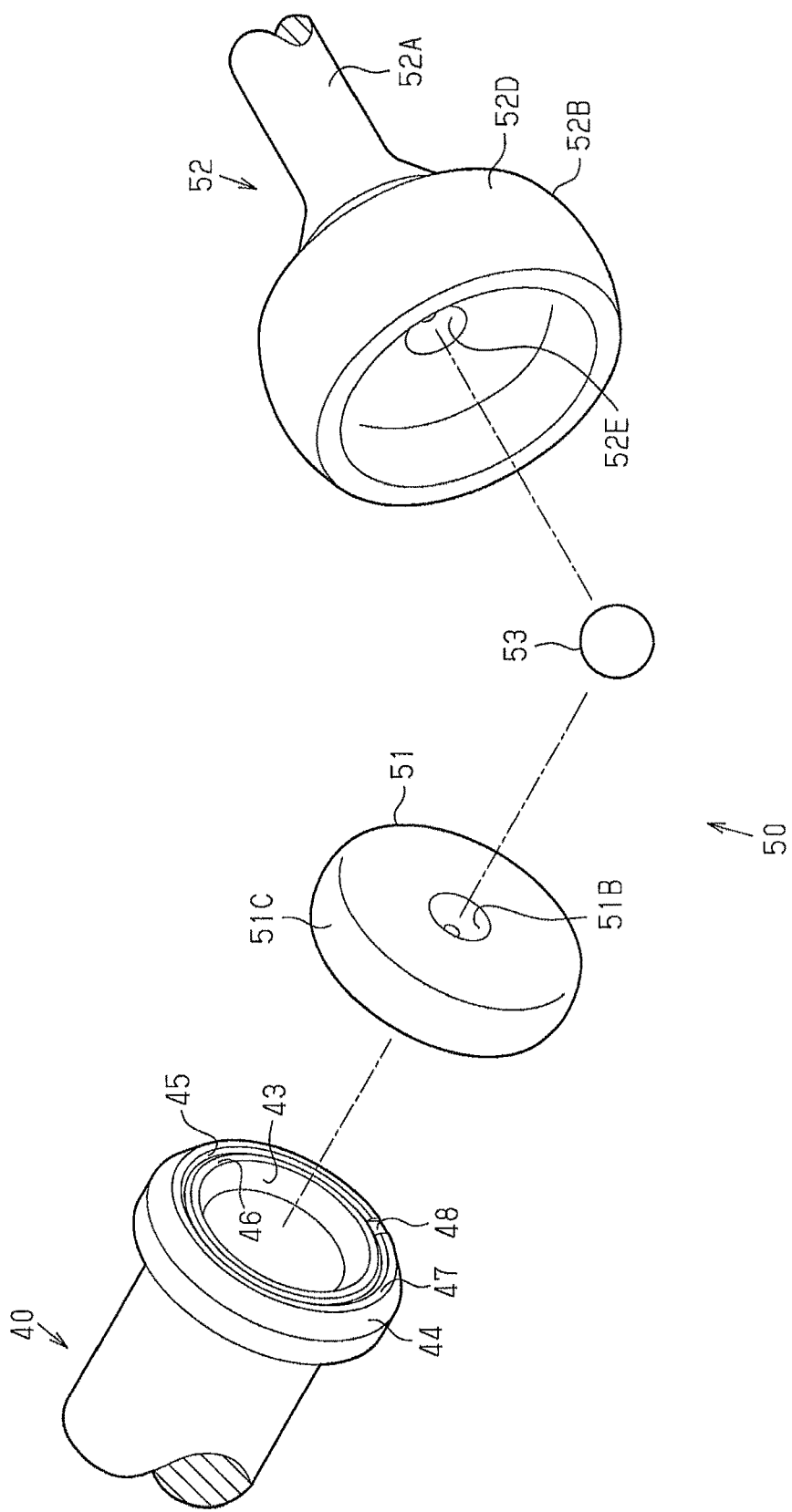
FIG. 2 is an exploded perspective view showing a valve seat, a valve member, a ball, and a support rod of the hydraulic valve of FIG. 1.

As shown in FIG. 2, the open end portion 42 includes an end surface that includes a recess 45, an inner contact surface 46, and an outer contact surface 47. The recess 45 may be a tubular groove, preferably, an annular groove. The inner contact surface 46, which is flat and annular, abuts on an inner side of the recess 45. The outer contact surface 47, which is flat and annular, abuts on an outer side of the recess 45 and includes a slot, which extends in a circumferential direction of the open end portion 42. The slot of the outer contact surface 47 defines a communication channel 48. The contact surfaces 46, 47 are each mirror-finished. One or both of the contact surfaces 46, 47 of the valve seat 40 may be referred to as a valve seat contact surface.

Figure 3A:
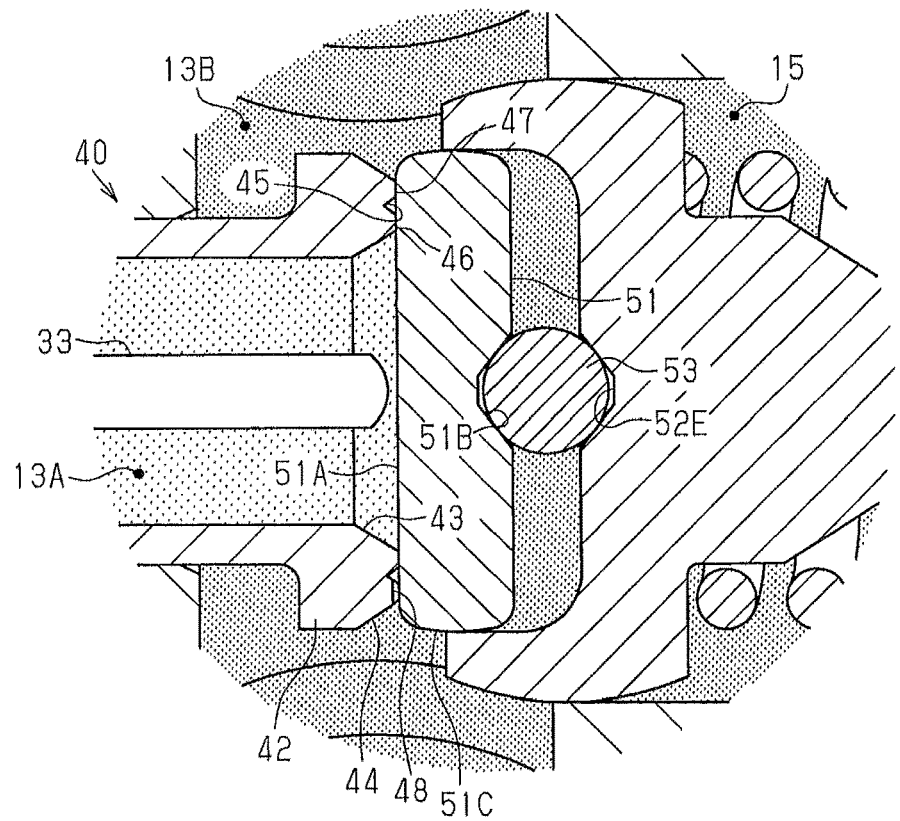
FIG. 3A is an enlarged view showing the valve member of FIG. 1 and its surrounding.

As shown in FIG. 3A, the open end portion 42 includes an inner circumferential surface the diameter of which increases in the first direction X1, defining an inner inclination portion 43. The open end portion 42 includes an outer circumferential surface the diameter of which decreases in the first direction X1, defining an outer inclination portion 44. The inner inclination portion 43 abuts on an inner side of the inner contact surface 46. The outer inclination portion 44 abuts on an outer side of the outer contact surface 47. Due to the inner inclination portion 43, the outer inclination portion 44, and the recess 45, the width of each of the contact surfaces 46, 47 is decreased in the direction orthogonal to the housing 10.

As shown in FIG. 1, the first spring 31 is coupled to each of the pressing rod 33 and the valve seat 40 in a compressive manner between the end, in the first direction X1, of the pressing rod 33 and the valve seat 40. The first spring 31 is coaxial to the pressing rod 33 and the valve seat 40.

The central passage of the valve seat 40 is closed by a valve member 51 on the open end portion 42. The valve member 51 includes a contact surface 51A capable of contacting the contact surfaces 46, 47 of the valve seat 40. The contact surface 51A may be referred to as a valve member contact surface. In the illustrated example, the valve member 51 is a portion of the valve unit 50, which is coaxial to the valve seat 40 along the central axis of the inner cavity 13. The valve unit 50 may include the valve member 51, a support rod 52, which supports the valve member 51, and a ball 53 located between the valve member 51 and the support rod 52. The ball 53 is an example of an adjustment mechanism, which adjusts the position of the valve member 51, that is, the angle of the valve member contact surface 51A, so that the valve member 51 comes in planar contact with the valve seat 40 rather than point contact or linear contact. The adjustment mechanism is not limited to the ball 53 and may, for example, adjust the inclination of the valve member 51 relative to the valve seat 40 when the valve member 51 includes a spherical or semispherical surface at a side opposite to the contact surface 51A. In the illustrated example, the position of the valve member 51 autonomously changes in accordance with the contact state of the valve member 51 with the valve seat 40. This autonomously adjusts the angle of the valve member contact surface 51A.

The valve member 51 may be discoidal. The valve member 51 contacts the open end portion 42 of the valve seat 40. It is preferred that the contact surface 51A of the valve member 51 be mirror-finished. The valve member 51 may include a ball support 51B, which is conically recessed in a central portion of a surface located at a side opposite to the contact surface 51A (refer to FIG. 2). The valve member 51 includes a convex outer circumferential surface 51C.

The support rod 52 is arranged in the housing 10 and coaxial to the pressing rod 33 and the valve seat 40. The support rod 52 is accommodated in the poppet support 23 and inserted in the rod insertion hole 23B.

The support rod 52 includes a stick-shaped rod body 52A, a valve support 52B, and a rod driver 52C. The valve support 52B and the rod driver 52C are respectively formed in two opposite ends of the rod body 52A.

The valve support 52B has a larger diameter than the rod body 52A and is cup-shaped to open in the second direction X2. The valve support 52B includes a convex outer circumferential surface 52D. As shown in FIG. 2, the valve support 52B includes a ball support 52E, which is conically recessed in a central portion of a surface opposed to the valve member 51. As shown in FIG. 3A, an open end portion of the valve support 52B includes an inner circumferential surface, which is spaced apart by a slight gap and opposed to the outer circumferential surface 51C of the valve member 51. The ball 53 is held between the ball support 52E of the valve support 52B and the ball support 51B of the valve member 51. A gap is formed between the valve member 51 and the valve support 52B in the longitudinal direction of the housing 10 and filled with oil.

As shown in FIG. 1, the rod driver 52C projects beyond the poppet support 23 in the first direction X1 and is fitted in the housing 10. A seal member 62 is attached to the rod driver 52C. The seal member 62 is elastic and, for example, an O-ring. The auxiliary oil channel 14 opens to a third hydraulic chamber 13C of the inner cavity 13.

A portion surrounded by the valve support 52B, the seal member 62 of the rod driver 52C, and the poppet support 23 functions as a damper chamber 15.

In the damper chamber 15, a second spring 32 is held between the valve support 52B and the end, in the first direction X1, of the poppet support 23. The second spring 32 and the first spring 31 are coaxially arranged and opposed along the central axis of the inner cavity 13. The second spring 32 presses the valve member 51 toward the valve seat 40 with the valve support 52B located between the second spring 32 and the valve member 51.

In the hydraulic valve 1 having the above structure, the inner cavity 13 includes a first hydraulic chamber 13A, a second hydraulic chamber 13B, and the third hydraulic chamber 13C. As indicated by the light shading in the drawings, the first hydraulic chamber 13A is in communication with the first port 11 and surrounded by the rod support 21, the seat support 22, the valve seat 40, and the valve member 51. As indicated by the dark shading in the drawings, the second hydraulic chamber 13B is in communication with the second port 12 and surrounded by the valve seat 40, the valve unit 50, the poppet support 23, and the housing 10. The third hydraulic chamber 13C is surrounded by the seal member 62 and an end, in the first direction X1, of the inner cavity 13. The hydraulic pressure is supplied from the first hydraulic chamber 13A to the third hydraulic chamber 13C through the auxiliary oil channel 14. Such hydraulic pressure assists the valve member 51 when the valve member 51 presses the valve seat 40. The hydraulic pressure is applied from the third hydraulic chamber 13C to the rod driver 52C of the support rod 52 in correspondence with the outer diameter D1 of the seal member 62. This urges the valve unit 50 toward the valve seat 40. The third hydraulic chamber 13C is continuously in communication with the first hydraulic chamber 13A via the auxiliary oil channel 14. Thus, the third hydraulic chamber 13C and the first hydraulic chamber 13A are indicated by the same shading.

Figure 3B:
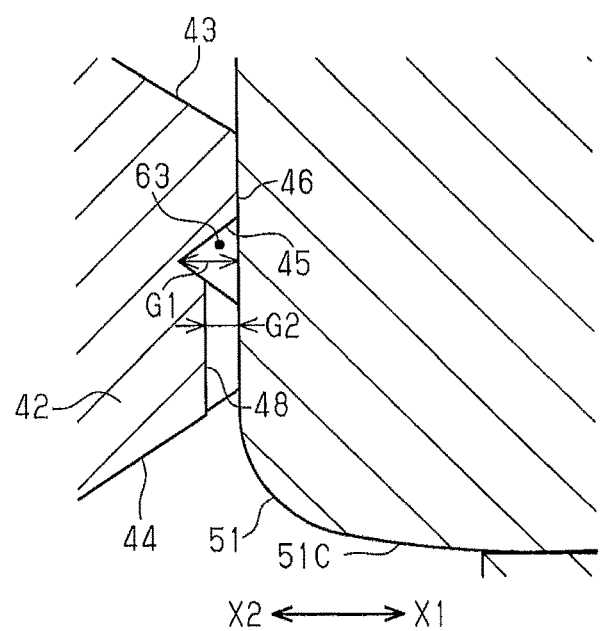
FIG. 3B is a partially enlarged view showing a contacting portion of the valve member and the valve seat.

The structure in which the valve seat 40 contacts the valve member 51 will now be described with reference to FIG. 3. To facilitate visual understanding, the shading is omitted from FIG. 3B.

As shown in FIG. 3A, the contact surface 51A of the valve member 51 is opposed to the open end portion 42 of the valve seat 40. The contact surface 51A of the valve member 51 is in planar contact with each of the contact surfaces 46, 47 of the open end portion 42 of the valve seat 40. The contact surface 51A has a larger outer diameter than the outer contact surface 47. As shown in FIG. 3B, the distance G1 between the inner contact surface 46 and a bottom surface of the recess 45 is longer than the distance G2 between the inner contact surface 46 and a bottom surface of the communication channel 48.

In this structure, a gap is formed by the contact surface 51A and the recess 45 of the valve seat 40. The oil flows from the second hydraulic chamber 13B to the gap through the communication channel 48. The gap formed by the contact surface 51A and the recess 45 has a larger volume than the gap formed by the communication channel 48 and the contact surface 51A. Thus, the gap formed by the contact surface 51A and the recess 45 forms a damper chamber 63 in which the oil limits sudden contact of the contact surface 51A with the contact surfaces 46, 47. More specifically, the volume of oil in the recess 45 is larger than that in the gap formed by the communication channel 48 and the contact surface 51A. This hinders discharging of oil out of the recess 45 through the communication channel 48 when the contact surface 51A contacts the contact surfaces 46, 47. Thus, the hydraulic pressure increases in the recess 45. Such increased hydraulic pressure serves as resisting force against movement of the contact surface 51A. Thus, the sudden contact of the contact surface 51A with the contact surfaces 46, 47 is limited.

The relief function of the hydraulic valve 1 will now be described with reference to FIG. 4.

As shown in FIG. 4A, when the hydraulic pressure of the first hydraulic chamber 13A becomes higher than that of the second hydraulic chamber 13B by at least the predetermined value, the valve member 51 is pushed in the first direction X1 due to the difference between the hydraulic pressure of the first hydraulic chamber 13A, which is in correspondence with the inner diameter D2 of the open end portion 42 of the valve seat 40, and the hydraulic pressure of the third hydraulic chamber 13C, which is in correspondence with the outer diameter D1 of the seal member 62. This moves the valve unit 50 in the first direction X1 against the second spring 32 and the hydraulic pressure of the third hydraulic chamber 13C. Consequently, the valve member 51 is separated from the open end portion 42 of the valve seat 40, resulting in an open state in which the first hydraulic chamber 13A is in communication with the second hydraulic chamber 13B. Thus, the oil flows from the first hydraulic chamber 13A to the second hydraulic chamber 13B and then to the second chamber 72 of the hydraulic cylinder 70 through the second port 12. This decreases the hydraulic pressure of the first hydraulic chamber 13A and the first chamber 71.

As shown in FIG. 4B, when the hydraulic pressure of the second hydraulic chamber 13B becomes higher than that of the first hydraulic chamber 13A by at least the predetermined value, the valve seat 40 is pushed in the second direction X2 due to the difference between the hydraulic pressure of the second hydraulic chamber 13B, which is in correspondence with the inner diameter D3 of the seal member 61, and the hydraulic pressure of the first hydraulic chamber 13A, which is in correspondence with the inner diameter D2 of the open end portion 42 of the valve seat 40. At this time, the valve member 51 contacts the pressing rod 33. This restricts movement of the valve member 51 in the second direction X2. Consequently, the open end portion 42 of the valve seat 40 is separated from the valve member 51, resulting in the open state. Thus, the oil flows from the second hydraulic chamber 13B to the first hydraulic chamber 13A and then to the first chamber 71 of the hydraulic cylinder 70 through the first port 11. This decreases the hydraulic pressure of the second hydraulic chamber 13B and the second chamber 72.

The hydraulic valve 1 of the present embodiment has the advantages described below.

Figure 8:
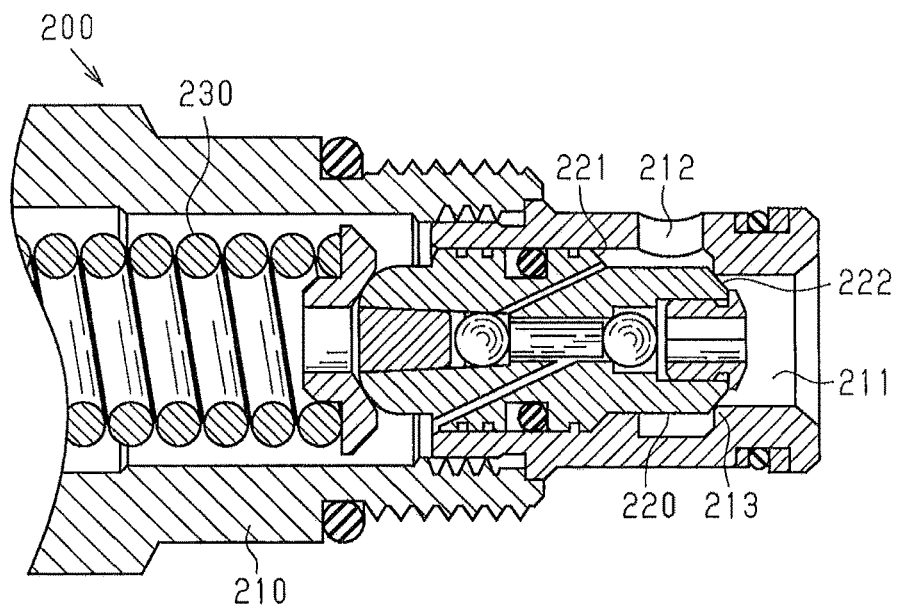
FIG. 8 is a cross-sectional view showing a conventional hydraulic valve.

(1) In the hydraulic valve 1, the contact surfaces 46, 47 of the valve seat 40 are opposed to the contact surface 51A of the valve member 51. When the contact surfaces 46, 47 are in planar contact with the contact surface 51A, the hydraulic valve 1 is in a closed state in which the first hydraulic chamber 13A and the second hydraulic chamber 13B are fluidically blocked. Thus, even when the valve member 51 is displaced relative to the valve seat 40, formation of a gap, which communicates the inside of the valve seat 40 with the valve member 51, between the contact surface 51A of the valve member 51 and the contact surfaces 46, 47 of the valve seat 40 is limited as compared to, for example, the hydraulic valve 200, shown in FIG. 8, in which the valve seat 213 is in linear contact with the poppet valve 220. Additionally, inclination of the valve member 51 relative to the valve seat 40 is limited compared to the hydraulic valve 200 shown in FIG. 8. This limits formation of the gap, communicating the inside of the valve seat 40 with the valve member 51, between the contact surface 51A of the valve member 51 and the contact surfaces 46, 47 of the valve seat 40.

Figure 9:
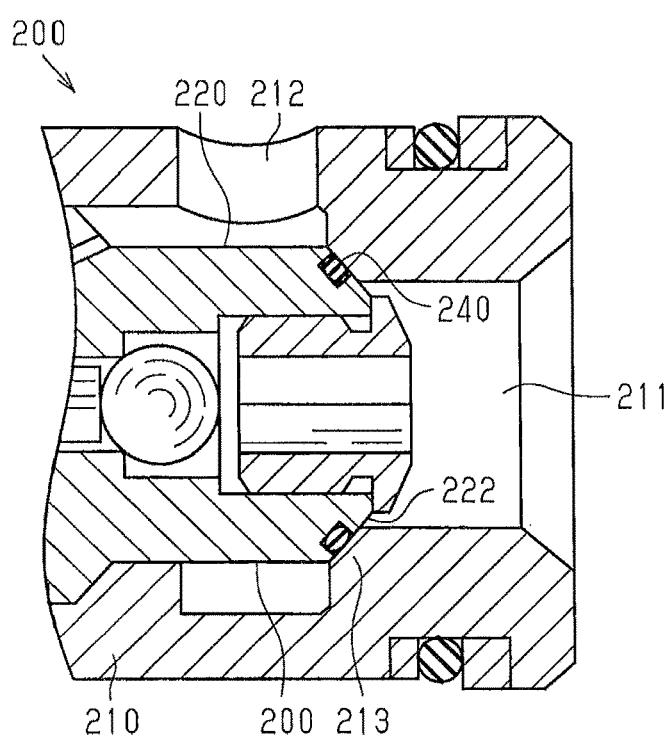
FIG. 9 is a cross-sectional view showing a comparative example of a hydraulic valve.

FIG. 9 shows a comparative example in which a valve seat 213 is tapered as extending away from a poppet valve 220 and an O-ring 240 is attached to a second taper 222 of the poppet valve 220. The O-ring 240 blocks a gap between the valve seat 213 and the poppet valve 220. This limits formation of a gap between the valve seat 213 and the poppet valve 220 even when the poppet valve 220 is displaced or inclined relative to the valve seat 213.

However, when a large amount of oil flows to the hydraulic valve 200 of the comparative example, the pressure of the hydraulic valve 200 increases and the hydraulic pressure of the hydraulic valve 200 acts on the O-ring 240. This may break the O-ring 240 or detach the O-ring 240 from the poppet valve 220. In such a case, a gap may be formed between the valve seat 213 and the poppet valve 220.

On the other hand, in the present embodiment, the contact surfaces 46, 47 of the valve seat 40 are directly in planar contact with the contact surface 51A of the valve member 51 without having an O-ring located in between. This eliminates inconveniences caused by O-rings. Thus, the present embodiment may also be suitable for a hydraulic circuit in which a large amount of oil flows.

(2) Since the contact surfaces 46, 47 of the valve seat 40 and the contact surface 51A of the valve member 51 are each mirror-finished, the degree of contact is increased between the contact surfaces 46, 47 and the contact surface 51A. This further limits oil leakage between the valve seat 40 and the valve member 51 during the closed state.

(3) The valve unit 50 includes the ball 53, which functions as the adjustment mechanism, and the support rod 52. Thus, even when the valve seat 40 is inclined relative to the valve member 51, the ball 53 pushes the valve member 51 and the support rod 52 supports the outer circumferential surface 51C of the valve member 51. Thus, the contact surface 51A of the valve member 51 is appropriately in planar contact with the contact surfaces 46, 47 of the valve seat 40. This increases the degree of contact between the contact surfaces 46, 47 of the valve seat 40 and the contact surface 51A of the valve member 51. Thus, oil leakage is further limited between the valve seat 40 and the valve member 51 during the closed state.

(4) The outer circumferential surface 51C of the valve member 51 is convex. This limits situations in which the outer circumferential surface 51C of the valve member 51 is stuck to the support rod 52 when the valve member 51 is moved relative to the support rod 52 due to the adjustment mechanism.

(5) The flat and annular contact surfaces 46, 47 and the annular recess 45 are formed in the open end portion 42 of the valve seat 40. Thus, the contact area of the valve seat 40 with the valve member 51 is decreased in size. Additionally, due to the recess 45, the contact surfaces 46, 47 easily come into direct contact with the contact surface 51A without oil located in between. This further limits oil leakage between the valve seat 40 and the valve member 51 during the closed state.

(6) When oil flows into the gap formed by the recess 45 and the valve member 51, a damper is formed. This limits sudden contact of the contact surface 51A of the valve member 51 with the contact surfaces 46, 47 of the valve seat 40.

(7) Since the damper chamber 15 is formed in the second hydraulic chamber 13B, separation of the valve member 51 from the valve seat 40 is limited. This limits occurrence of so-called "chatter," in which the valve member 51 shortly contacts with and separates from the valve seat 40 in a repetitive manner.

(8) The seal member 62, which is attached to the support rod 52, restricts movement and vibration of the support rod 52. This limits occurrence of chattering.

(9) The biasing force of the second spring 32, which presses the valve member 51 toward the valve seat 40, may be set in accordance with the difference between force of the hydraulic pressure applied from the first hydraulic chamber 13A through the central passage of the valve seat 40, which pushes the valve member 51 in a direction parting from the valve seat 40, and force of the hydraulic pressure of the auxiliary oil channel 14, which pushes the valve member 51 toward the valve seat 40. This allows for a decrease in the biasing force of the second spring 32, which presses the valve member 51 toward the valve seat 40. Thus, the second spring 32 may be reduced in size.

(10) The pressing rod 33 is inserted in the valve seat 40. Thus, the cavity of the valve seat 40 also serves as a space for the pressing rod 33. This simplifies the structure of the hydraulic valve 1.

(11) The contact surface 51A has a larger outer diameter than that of each of the contact surfaces 46, 47. Even when the valve member 51 and the valve seat 40 are displaced in the direction orthogonal to the housing 10, the planar contact may be easily maintained between the contact surface 51A and the contact surfaces 46, 47.

(12) The pressing rod 33 and the valve seat 40 include the tapers 33A, 41, respectively, where the pressing rod 33 and the valve seat 40 are opposed to each other. This gradually increases the cross-sectional passage area of the valve seat 40, thereby limiting formation of disturbed flow. Thus, the oil smoothly flows between the first port 11 and the second port 12.

(13) The open end portion 42 of the valve seat 40 extends in the direction orthogonal to the housing 10 and includes the inner inclination portion 43. This increases the cross-sectional passage area of the open end portion 42 of the valve seat 40. Thus, a large amount of oil may smoothly flow from the first port 11.

(14) The open end portion 42 of the valve seat 40 includes the inner inclination portion 43 and the outer inclination portion 44. This further decreases the size of each of the contact surfaces 46, 47 in the direction orthogonal to the housing 10. Thus, the contact surfaces 46, 47 easily come into direct contact with the contact surface 51A without oil located in between.

Second Embodiment

The structure of a second embodiment of a hydraulic valve 100 will now be described with reference to FIG. 5.

The hydraulic valve 100 includes a housing 110 provided with an inner cavity 113, a first port 111, and a second port 112. The first port 111 and the second port 112 are communicated with the inner cavity 113. The inner cavity 113 accommodates a seat support 121, a poppet support 122, a valve seat 130, a valve element 140, a spring support 150, and a compressed coil spring 160.

The seat support 121 is fitted in the housing 110 between the first port 111 and the second port 112. The seat support 121 is cup-shaped and opens toward the poppet support 122. The seat support 121 includes an inner circumferential portion, defining a seat support hole 121A. A seal member 123 is attached to the seat support hole 121A. One example of the seal member 123 is an O-ring.

The poppet support 122 is coupled to an open end of the seat support 121. The poppet support 122 is threaded into the housing 110. The poppet support 122 is cup-shaped and opens toward the seat support 121. The poppet support 122 includes a portion that is opposed to the first port 111 and provided with a cutaway portion 122A. The poppet support 122 includes an end that is located at a side opposite to the seat support 121 and provided with a recess 122B. The recess 122B is defined by an inner circumferential portion, to which a seal member 124 is attached. One example of the seal member 124 is an O-ring.

Figure 5:
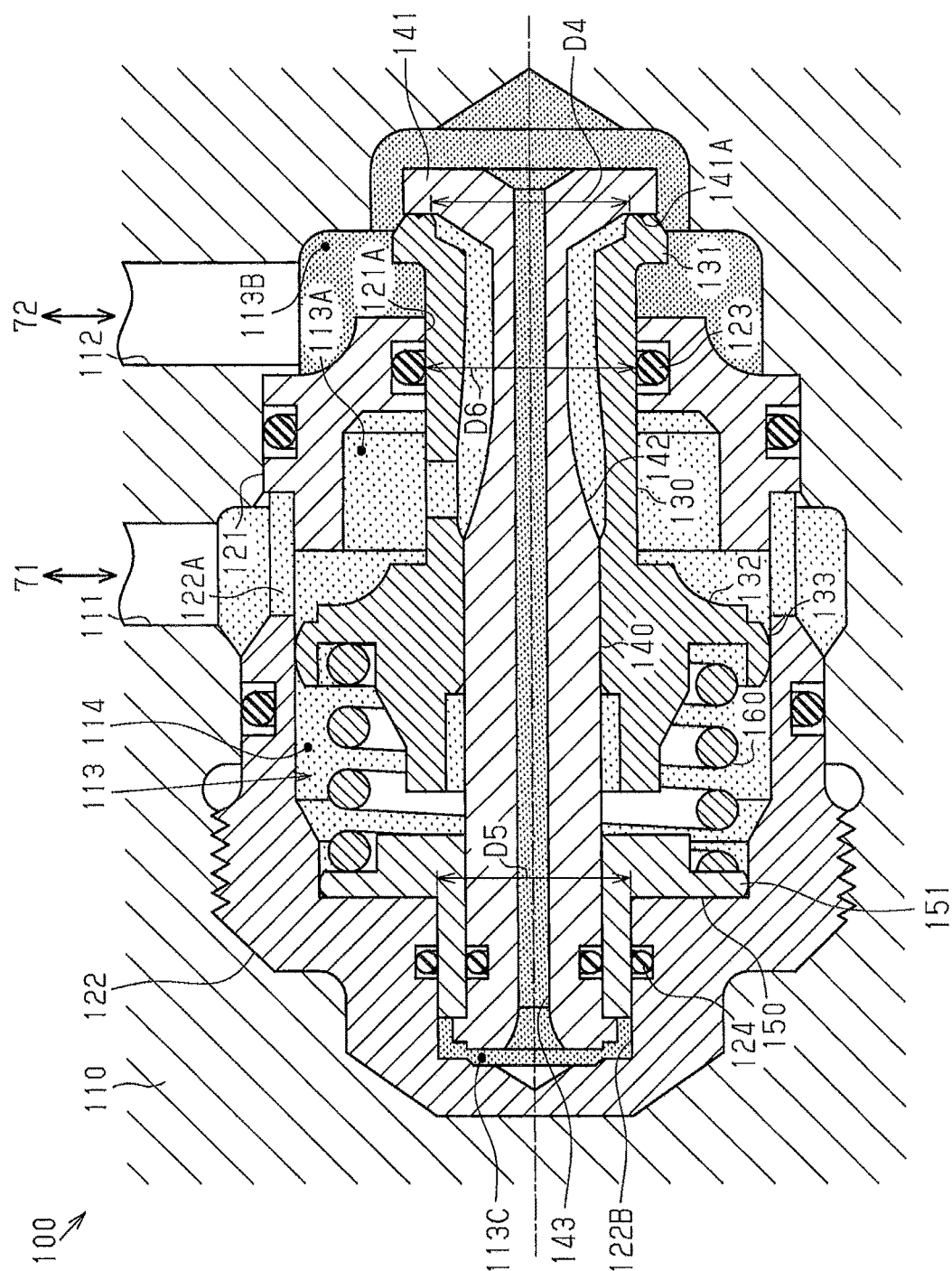
FIG. 5 is a cross-sectional view showing a second embodiment of a hydraulic valve.

The valve seat 130 is tubular and extends along a central axis of the inner cavity 113 indicated by a dot-and-dash line in FIG. 5. In some embodiments, the central axis of the inner cavity 113 may be a longitudinal axis of the housing 110. The valve seat 130 is fitted in the seat support hole 121A of the seat support 121. The valve seat 130 includes an open end portion 131 at a side opposite to the poppet support 122. The open end portion 131 extends in a direction orthogonal to the central axis of the inner cavity 113 (hereafter, referred to as the direction orthogonal to the housing 110). The open end portion 131 has the same shape as the open end portion 42 of the valve seat 40 of the first embodiment. The valve seat 130 includes an end that is located at a side opposite to the open end portion 131 and provided with a support 132. The support 132 extends in the direction orthogonal to the housing 110. The support 132 includes a convex outer circumferential surface 133. The outer circumferential surface 133 of the support 132 is spaced apart by a slight gap and opposed to an inner circumferential surface of the poppet support 122.

The valve element 140 is tubular and fitted to an inner circumferential surface of the valve seat 130. More specifically, the valve element 140 is coaxial to the valve seat 130. The valve element 140 includes an end that is located at a side opposite to the poppet support 122 and provided with a valve member 141. The valve member 141 opens and closes the open end portion 131 of the valve seat 130.

The valve member 141 has a larger outer diameter than portions of the valve element 140 other than the valve member 141. The valve member 141 includes a contact surface 141A, which contacts the open end portion 131, is mirror-finished. The contact surface 141A of the valve member 141 is in planar contact with the open end portion 131. The valve element 140 includes an intermediate portion the diameter of which decreases toward the valve member 141, defining a taper 142. The valve element 140 also includes a supply oil channel 143, which extends through the valve element 140 along the central axis of the inner cavity 113.

The spring support 150 is fitted to an end of the valve element 140 located at a side opposite to the valve member 141. The spring support 150 is fitted in the recess 122B of the poppet support 122. The spring support 150 includes a support 151, which extends in the direction orthogonal to the housing 110. The support 151 is in contact with a peripheral portion of the recess 122B that intersects with the central axis of the inner cavity 113.

In this structure, a cavity, which is surrounded by the poppet support 122, the valve seat 130, the valve element 140, and the spring support 150, functions as a damper chamber 114. In the damper chamber 114, the spring 160 is located between the support 151 of the spring support 150 and the support 132 of the valve seat 130 in a compressed state.

In the hydraulic valve 100 having the above structure, the inner cavity 113 includes a first hydraulic chamber 113A, a second hydraulic chamber 113B, and a third hydraulic chamber 113C. As indicated by the light shading in the drawings, the first hydraulic chamber 113A is in communication with the first port 111 and surrounded by the poppet support 122, the seat support 121, the inside of the valve seat 130, and the valve member 141 of the valve element 140. As indicated by the dark shading in the drawings, the second hydraulic chamber 113B is in communication with the second port 112 and surrounded by the seat support 121, the housing 110, the inside of the valve element 140, and the poppet support 122. The third hydraulic chamber 113C is surrounded by the recess 122B of the poppet support 122, the valve element 140, the spring support 150, and the seal member 124. Thus, when the hydraulic pressure, which is in correspondence with the inner diameter D5 of the seal member 124, is supplied from the second hydraulic chamber 113B to the third hydraulic chamber 113C, the force acts on the valve element 140 in a direction in which the valve member 141 is separated from the open end portion 131 of the valve seat 130. The third hydraulic chamber 113C is continuously in communication with the second hydraulic chamber 113B via the supply oil channel 143. Thus, the third hydraulic chamber 113C and the second hydraulic chamber 113B are indicated by the same shading.

The relief function of the hydraulic valve 100 will now be described.

When the hydraulic pressure of the first hydraulic chamber 113A becomes higher than that of the second hydraulic chamber 113B by at least the predetermined value, the valve element 140 is pushed in a direction in which the valve member 141 is separated from the valve seat 130 due to the difference between the hydraulic pressure of the first hydraulic chamber 113A, which is in correspondence with the inner diameter D4 of the open end portion 131 of the valve seat 130, and the hydraulic pressure of the second hydraulic chamber 113B, which is in correspondence with the inner diameter D5 of the seal member 124. This separates the valve member 141 from the open end portion 131 of the valve seat 130 against the force of the hydraulic pressure of the third hydraulic chamber 113C that hinders movement of the valve element 140. Consequently, the first hydraulic chamber 113A and the second hydraulic chamber 113B are communicated with each other, or in the open state. Thus, the oil flows from the first hydraulic chamber 113A to the second hydraulic chamber 113B and then to the second chamber 72 of the hydraulic cylinder 70 through the second port 112. This decreases the hydraulic pressure of the first hydraulic chamber 113A.

When the hydraulic pressure of the second hydraulic chamber 113B becomes higher than that of the first hydraulic chamber 113A by at least the predetermined value, the valve seat 130 is pushed in a direction parting from the valve member 141 due to the difference between the hydraulic pressure of the second hydraulic chamber 113B, which is in correspondence with the inner diameter D6 of the seal member 123, and the hydraulic pressure of the first hydraulic chamber 113A, which is in correspondence with the inner diameter D4 of the open end portion 131 of the valve seat 130. At this time, in the valve element 140, the hydraulic pressure of the third hydraulic chamber 113C restricts movement of the valve member 141 toward the valve seat 130. Consequently, the open end portion 131 of the valve seat 130 is separated from the valve member 141, resulting in the open state. Thus, the oil flows from the second hydraulic chamber 113B to the first hydraulic chamber 113A and then to the first chamber 71 of the hydraulic cylinder 70 through the first port 111. This decreases the hydraulic pressure of the second hydraulic chamber 113B.

The hydraulic valve 100 of the present embodiment has the advantage described below in addition to advantages (1), (2), (5), (6), (11), (13), and (14) of the hydraulic valve 1 of the first embodiment.

(15) The valve element 140 is configured to be inserted in the valve seat 130. This reduces the size of the hydraulic valve 100 in the longitudinal direction of the housing 110.

MODIFIED EXAMPLES

It should be apparent to those skilled in the art that the present invention may be embodied in many other specific forms without departing from the scope of the invention. Particularly, it should be understood that the present invention may be embodied in the following forms.

Modified Example 1

In the hydraulic valve 1 of the first embodiment, the pressing rod 33, which is inserted in the valve seat 40, restricts movement of the valve member 51 toward the valve seat 40. However, the means of restricting the movement of the valve member 51 toward the valve seat 40 is not limited to that of the first embodiment. For example, movement of the valve member 51 toward the valve seat 40 may be restricted when a plurality of rods (not shown), which are arranged around the valve seat 40 and fixed to the seat support 22, contact a periphery of the contact surface 51A of the valve member 51.

Modified Example 2

In the open end portion 42 of the valve seat 40 of the first embodiment, the communication channel 48 extends in the direction orthogonal to the housing 10. However, the shape of the communication channel 48 is not limited to that of the first embodiment. For example, the communication channel 48 may be annular and formed in the entire circumference of the open end portion 42. In this case, the distance in a gap formed by the communication channel 48 and the contact surface 51A of the valve member 51 is shorter than the distance in a gap formed by the recess 45 and the contact surface 51A. More specifically, the depth of the communication channel 48 is set so that the gap formed by the communication channel 48 and the contact surface 51A has a smaller volume than the gap formed by the recess 45 and the contact surface 51A.

Modified Example 3

In the above modified example 2, the communication channel 48 may be formed at an inner side of the recess 45 of the valve seat 40.

Modified Example 4

Figure 6:
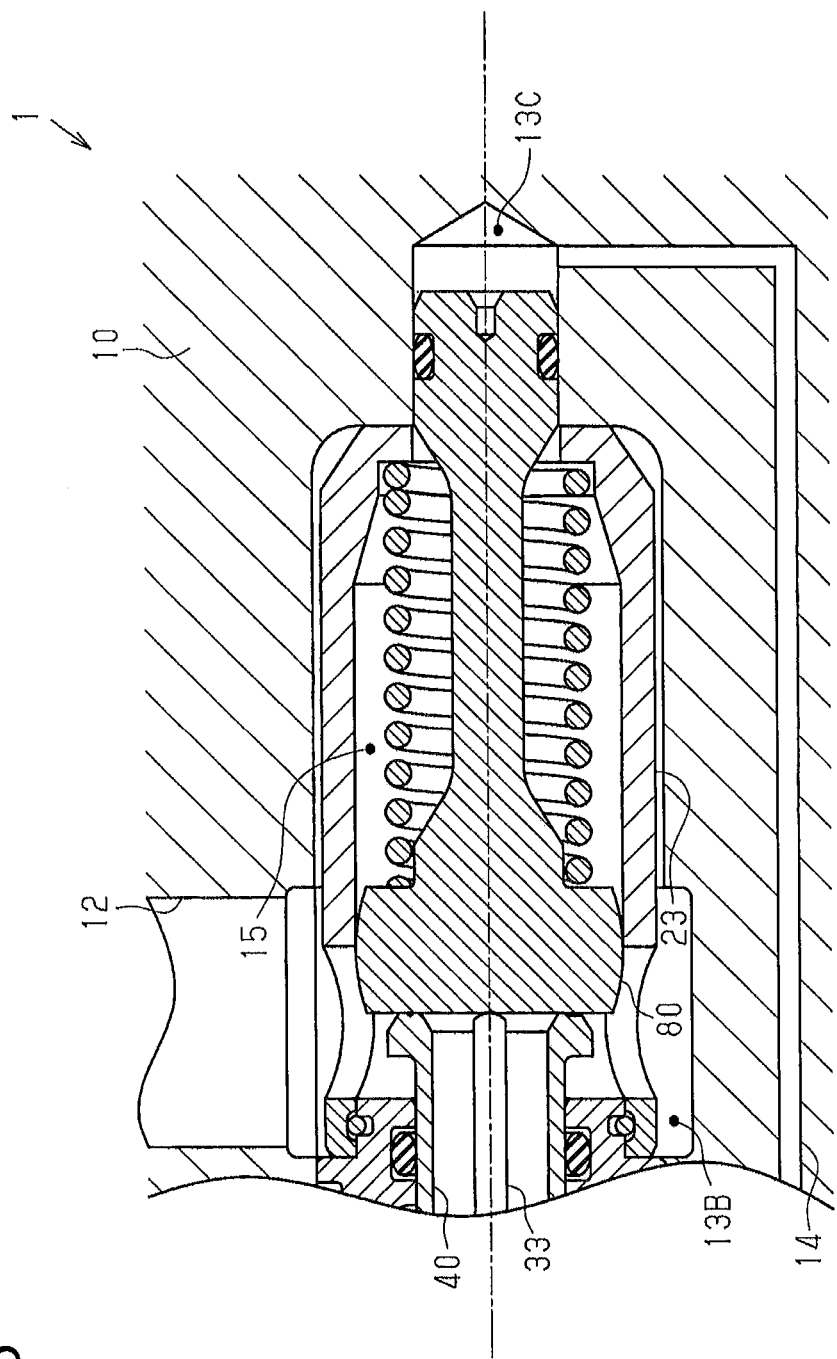
FIG. 6 is a partially cross-sectional view showing a modified example of a hydraulic valve.

In the first embodiment, the valve unit 50 has a structure in which the valve member 51, the support rod 52, and the ball 53 are combined. However, the structure of the valve unit 50 is not limited to that of the first embodiment. For example, as shown in FIG. 6, a valve member 80 may be configured, as a single component, such that the ball 53 is omitted and the valve member 51 and the support rod 52 are unified. In this case, the valve member 80 and the poppet support 23 define the damper chamber 15.

Modified Example 5

In the first embodiment, the contact surfaces 46, 47 of the valve seat 40 and the contact surface 51A of the valve member 51 are each mirror-finished. However, the mirror-finishing process may be omitted from the contact surface 51A or one of the contact surfaces 46, 47. Alternatively, the mirror-finishing process may be omitted from both the contact surfaces 46, 47 and the contact surface 51A.

Modified Example 6

Figure 7:
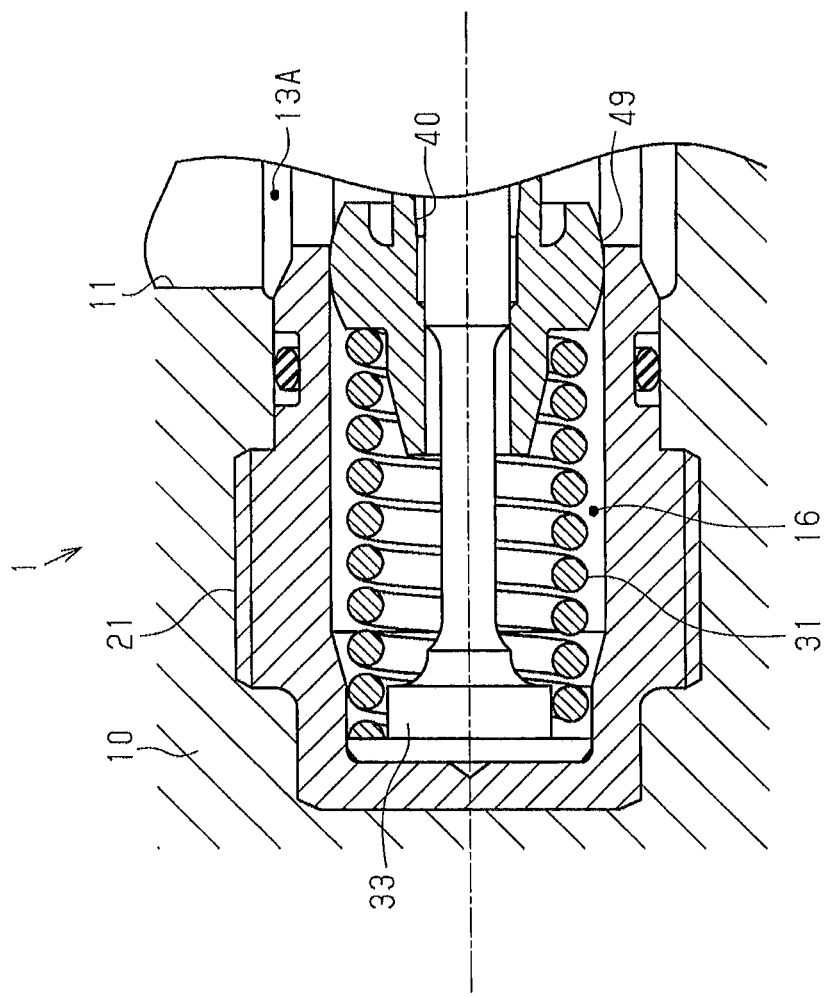
FIG. 7 is a partially cross-sectional view showing another modified example of a hydraulic valve.

In the first embodiment, the first hydraulic chamber 13A does not include a damper chamber between the valve seat 40 and the rod support 21. However, as shown in FIG. 7, a damper chamber 16 may be formed between the valve seat 40 and the rod support 21. In this case, the valve seat 40 includes a convex outer circumferential surface 49, which is opposed to the rod support 21 and proximate to the inner circumferential surface of the rod support 21.

The present examples and embodiments are to be considered as illustrative and not restrictive, and the invention is not to be limited to the details given herein, but may be modified within the scope and equivalence of the appended claims.

The invention claimed is:

1. A two-port hydraulic valve comprising:
   a housing including first and second ports, a first hydraulic chamber and a second hydraulic chamber, wherein the first and second hydraulic chambers are communicated with the first and second ports, respectively;
   a valve seat located in the first hydraulic chamber, wherein the valve seat has a tubular shape including a central passage and an open end, wherein the open end includes a flat valve seat contact surface;
   a valve member located in the second hydraulic chamber and including a valve member contact surface; and
   a biasing member that generates a biasing force to press the valve seat and the valve member so that the valve member contact surface comes in planar contact with the flat valve seat contact surface,
   wherein, when hydraulic pressure of the first hydraulic chamber is higher than that of the second hydraulic chamber, the hydraulic pressure of the first hydraulic chamber acts on the valve member through the central passage of the valve seat to separate the valve member from the valve seat against the biasing force of the biasing member so that the first hydraulic chamber and the second hydraulic chamber come into fluidal communication,
   wherein, when hydraulic pressure of the second hydraulic chamber is higher than that of the first hydraulic chamber, a hydraulic pressure difference between the first hydraulic chamber and the second hydraulic chamber acts on the valve seat to separate the valve seat from the valve member against the biasing force of the biasing member so that the first hydraulic chamber and the second hydraulic chamber come into fluidal communication,
   wherein the open end of the valve seat includes the flat valve seat contact surface that includes at least one flat and annular surface for the planar contact with the valve member contact surface, and an annular recess located adjacent to the flat valve seat contact surface and incapable of contacting the valve member contact surface, and
   wherein the open end of the valve seat includes a communication channel, which fluidically communicates the second hydraulic chamber with the recess, and when the valve seat contact surface is in contact with the valve member contact surface, a gap formed by the communication channel and the valve member has a smaller volume than a gap formed by the recess and the valve member.

2. The hydraulic valve according to claim 1, wherein the valve member is mounted for adjusting movement to adjust an inclination of the valve member relative to the valve seat such that the valve member contact surface of the valve member comes in planar contact with the flat valve seat contact surface of the valve seat.

3. The hydraulic valve according to claim 1, wherein at least one of the valve member contact surface and the flat valve seat contact surface is mirror-finished.

4. The hydraulic valve according to claim 2, further comprising: an adjustment mechanism coupled to the valve member or included in the valve member, wherein the adjustment mechanism is configured to adjust the inclination of the valve member such that the flat valve seat contact surface of the valve member comes in the planar contact with the valve member contact surface.

5. The hydraulic valve according to claim 1, wherein the valve member includes a convex side surface, which differs from the valve member contact surface.

6. The hydraulic valve according to claim 1, wherein the second hydraulic chamber includes a damper chamber, and wherein the damper chamber and the valve seat are located at opposite sides of the valve member.

7. The hydraulic valve according to claim 1, further comprising: a support rod fitted in the housing, wherein an elastic seal member is located between the support rod and the housing, and wherein the support rod is configured to support the valve member from a side opposite to the valve seat.

8. The hydraulic valve according to claim 1, wherein the biasing member includes a first spring that presses the valve seat toward the valve member, and a second spring opposed to the first spring, and
   wherein the second spring is configured to press the valve member toward the valve seat.

9. The hydraulic valve according to claim 8, further comprising an auxiliary oil channel that is in communication with the first hydraulic chamber so that the hydraulic pressure of the first hydraulic chamber assists the valve member when the valve member presses the valve seat.

10. The hydraulic valve according to claim 1, further comprising a rod inserted in the central passage of the valve seat to restrict movement of the valve member toward the valve seat.

11. The hydraulic valve according to claim 1, wherein the valve member contact surface is flat for the planar contact with the flat valve seat contact surface.

\* \* \* \* \*